(12) United States Patent
Doolittle et al.

(10) Patent No.: US 7,011,194 B1
(45) Date of Patent: Mar. 14, 2006

(54) DRUM-IN-HAT TORQUE LIMITER

(75) Inventors: James E. Doolittle, Granger, IN (US); William E. Sherman, II, South Bendanger, IN (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/711,049

(22) Filed: Aug. 19, 2004

(51) Int. Cl.
*F16D 51/00* (2006.01)

(52) U.S. Cl. ................ 188/328; 188/341; 188/325

(58) Field of Classification Search ........ 188/325–343, 188/79.51, 71.7, 70 R
See application file for complete search history.

(56) References Cited

U.S. PATENT DOCUMENTS

| | | | |
|---|---|---|---|
| 3,384,205 A | | 5/1968 | Chouings |
| 5,180,037 A | * | 1/1993 | Evans ...................... 188/70 R |
| 6,234,281 B1 | | 5/2001 | Sherman et al. |
| 6,360,852 B1 | * | 3/2002 | Sherman et al. .......... 188/70 R |
| 6,619,443 B1 | | 9/2003 | Ring |
| 6,651,789 B1 | * | 11/2003 | Loken et al. ............... 188/328 |
| 6,742,633 B1 | * | 6/2004 | Sherman et al. ........... 188/325 |

* cited by examiner

*Primary Examiner*—Melanie Torres
(74) *Attorney, Agent, or Firm*—Leo H McCormick, Jr.; Warren Comstock; Sara H Taylor

(57) ABSTRACT

A parking brake having first and second brake shoes each of which has a first end that engages an anchor post on a backing plate and a second end that engages an adjuster. An actuator that is located adjacent an anchor post engages a first end and an adjuster engages a second end of webs for the first and second brake shoes. A brake cable that is connected to the actuator provides a force for moving the first and second brake shoes into engagement with a drum to effect a brake application. The adjuster is characterized by the adjuster mechanism including a yieldable member for reducing the space between the second end engagement between the webs to limit braking force to a predetermined maximum. A strut of the adjuster compresses at loads above a predetermined set load to thereby reduces the effective braking diameter, input loads and hence output torque.

8 Claims, 4 Drawing Sheets

DRUM-IN-HAT TORQUE LIMITER

BACKGROUND OF INVENTION

The present invention relates to auxiliary braking systems and more particularly to an auxiliary brake adjuster mechanism including a yieldable member for modifying brake shoe spacing to limit braking force to a predetermined maximum.

A wide variety of auxiliary (sometimes called parking or emergency) brakes are known. Some employ independent braking surfaces while others employ alternate techniques for independent actuation of the vehicle service brakes. One of the independent braking surfaces is typically prevented from rotating by being fixed to the vehicle and another braking surface is fixed to and rotates with a vehicle wheel, for example, as in the well-known drum-in hat braking mechanisms. Also, one of the braking surfaces may be fixed to the vehicle while another is fixed to a rotatable portion which is indirectly coupled to and rotates with a vehicle wheel, for example, as in brakes employing a flexible friction band which surrounds a drum fixed to a vehicle drive shaft. In all cases, however, wheel rotation is retarded when the auxiliary brake is applied. The auxiliary brake may be hydraulically actuated, spring actuated, actuated by a mechanical coupling such as a cable, or a combination of these techniques may be employed. Mechanical actuation of the auxiliary brake may be by way of a cable, and a foot depressible pedal or hand actuated lever, or the brake may be applied automatically when a shift lever is moved to the "park" position and released when that lever is moved away from the "park" position. Other brake applying and releasing controls may be employed. Auxiliary brakes may be embodied in a completely independent form, or may share components with the normal service brakes. Component sharing typically reduces overall cost. One common technique employs the use of an operator actuable cable and linkage for independently moving the service braking surfaces into and from engagement. In this common system, an automatic service brake adjuster may be operable when braking during backing to maintain a desired brake surface running clearance. In this case, periodic adjustment of cable length is the only other adjustment required. A preferred embodiment of the present invention is use in a mechanically operable drum-in-hat auxiliary brake having an independent actuator, adjuster, and brake shoes with the only shared component being a rotor-drum assembly. The techniques of the present invention may be applied to other types of braking systems.

The desirability of limiting braking forces has been addressed in the prior art as in U.S. Pat. No. 6,619,443 that discloses an overload protection device for a truck-mounted brake assembly on a railcar. Railroad car brakes employ pneumatic as well as manual devices for applying the same brake. If the pneumatic brake system is activated and then the manual device is also actuated, the forces on the brake assembly are multiplied and brake beam deflection or failure may result. The patented arrangement provides a preloaded compression member in a chamber to absorb excess force before deflection and possible failure of the brake beam occurs.

In the highway vehicular area, force limiting has also been addressed, but in complex systems dealing with the vehicle service brakes. Antilock or anti-skid braking systems are, of course, broadly brake force limiting systems as disclosed in U.S. Pat. No. 3,384,205 wherein a drum style service brake includes a yieldable abutment that permits circumferential displacement of both the primary and secondary brake shoes. Displacement is limited by a stop whereupon further increase in the brake actuating force results in only movement of the actuating piston associated with the secondary shoe so that braking increases with a trailing shoe action. The prior art has not addressed failure to release the auxiliary or parking brake prior to driving away, let alone solve that problem in the unique and economical manner herein suggested.

Despite the presence of warning lights and buzzers, drivers may still occasionally forget to release the parking brake and drive away with the brake still applied. This results in excessive wear, overheating and, all to often, permanent damage to the parking brake mechanism. In particular, an auxiliary brake such as a high gain drum-in-hat parking brake may be subject to failure when an operator drives off without releasing the park brake. Brake shoes may buckle, anchoring structures may fracture, or other damage may result. It is desirable to limit braking force and reduce the likelihood of damage to an auxiliary braking system by excessive braking forces.

SUMMARY OF INVENTION

The present invention provides a brake force limiting mechanism operative upon the brake actuating force reaching a predetermined level to limit further increase in brake actuating force.

The invention comprises, in a preferred embodiment, a braking force limiting brake adjuster for a wheeled vehicle auxiliary brake assembly of the drum-in-hat variety. The adjuster mechanism includes a yieldable member for reducing the space between engagement ends of each of two brake shoe webs to limit braking force to a predetermined maximum. The adjuster mechanism may comprise a threaded interengaged adjuster screw and adjustment nut, a sleeve for receiving in one end a limited portion of the adjuster screw with the portion being determined by the position of the adjustment nut, a plunger having a limited portion received in the sleeve other end, a first flange on the sleeve other end, a second flange on the plunger intermediate the ends thereof. The yieldable member may comprise a load limiting compression spring, such as a plurality of aligned domed washers, captive between the sleeve flange and plunger flange. The limited portion of the plunger, which is received in the sleeve, may be determined by the separation between the flanges, which separation is controlled by the degree of compression of the spring.

An advantage of the present invention is that damage to an auxiliary braking system caused by inadvertent failure to appropriately release the brake is minimized.

DETAILED DESCRIPTION

Figure 1:
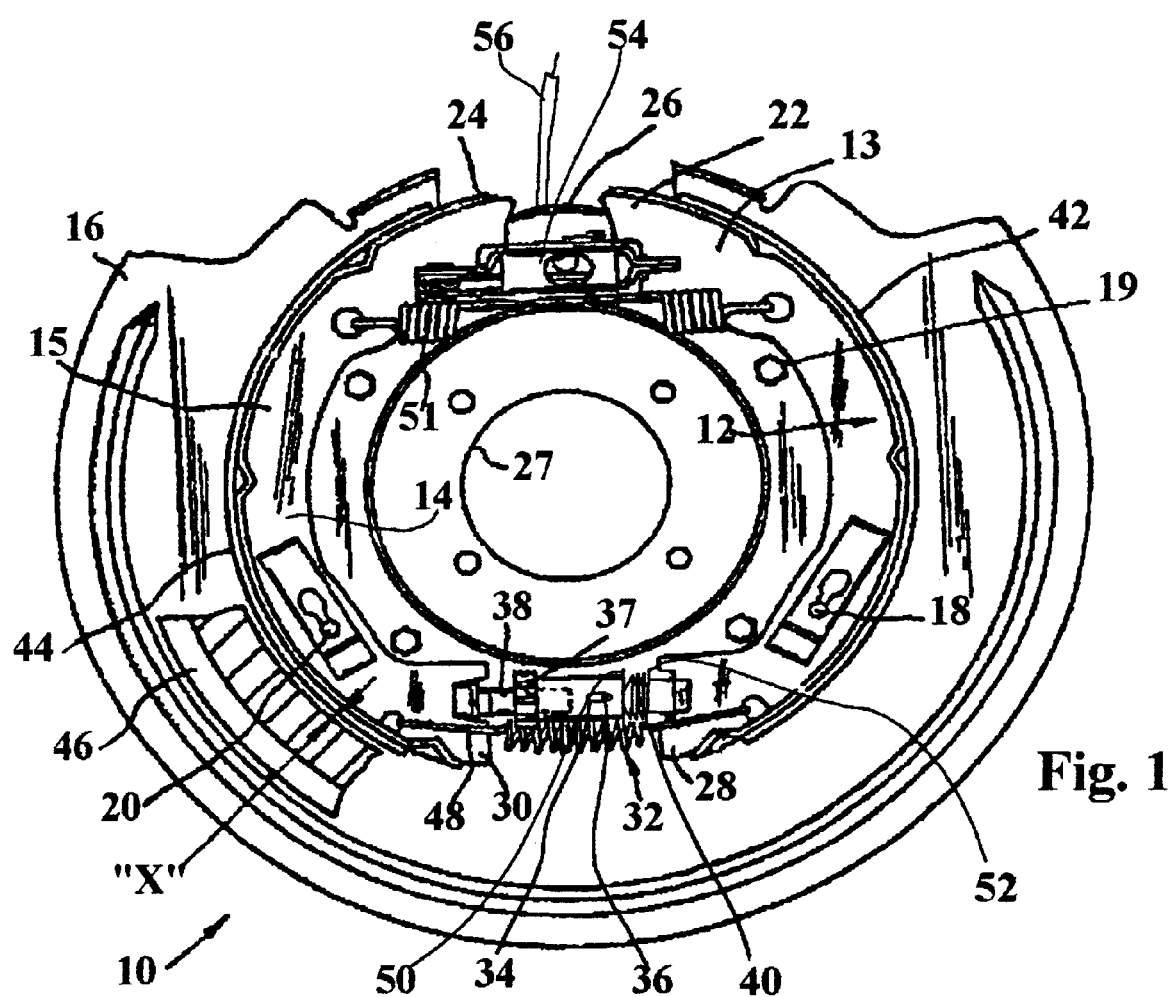
FIG. 1 is a side elevation view of a portion of a vehicle braking system.

Corresponding reference characters indicate corresponding parts throughout the several drawing views.

Referring now to the drawings generally, an auxiliary brake assembly for a wheeled vehicle is defined by a vehicle drum-in-hat brake 10 that includes a first braking surface such as brake shoes 12 and 14 that are fixed to a stationary portion of the vehicle, for example, the backing plate 16 and a second braking surface on a drum 46. Drum 46 is fixed to and rotates with a vehicle wheel. An operator actuable brake actuating assembly 54 that is controlled by cable 56 selectively forces the first and second brake surfaces together to retard rotation of the vehicle wheel. Cable 56 may, for example, be a conventional Bowden for transmitting force from a foot pedal or lever within the vehicle. A braking surface running clearance adjustment mechanism 32 includes a brake force limiting mechanism, here illustrated as including conical washers 40, which is operative upon the brake actuating force reaching a predetermined level to limit further increase in brake actuating force.

Referring more particularly to FIG. 1, there is shown a vehicle drum-in-hat brake 10 for use in effecting a parking brake application. The drum-in-hat brake 10 is of a type illustrated in U.S. Pat. No. 6,234,281 and includes a backing plate 16 that is fixed by bolts such as 19 to a vehicle. There is an opening 27 through which an axle shaft of the vehicle passes with first 12 and second 14 brake shoes retained in radial alignment on the backing plate 16 by first 18 and second 20 pins that are secured to the backing plate 16. Brake shoe 12 has a first engagement end 22 and brake shoe 14 has a first engagement end 24 that, respectively, contact an anchor block 26 attached to the vehicle that extends through the backing plate 16. Further, brake shoe 12 has a second engagement end 28 and brake shoe 14 has a second engagement end 30 that, respectively, contact an adjuster strut mechanism 32. The first engagement end of each of the first and second webs is aligned with an actuator assembly 54 while the second engagement end of each of the first and second webs is spaced apart by the adjuster mechanism or strut mechanism 32. The strut mechanism 32 normally functions as in known prior art to link web 13 on brake shoe 12 with web 15 on brake shoe 14 in such a manner that a force experienced on engagement of either brake shoe 12,14 with drum 46 is directly communicated to the other. The length of the strut mechanism 32 may be altered by rotating star wheel 37 to establish and maintain a predetermined running clearance "X" between a first friction pad 42 on brake shoe 12 and a second friction pad 44 on brake shoe 14, and a drum 46. This adjustment may be manually effected as necessary during periodic vehicle maintenance, or known automatic adjustment techniques may be incorporated. A resilient arrangement includes a first spring 51 that connects to the first brake shoe 12 with the second brake shoe 14 to respectively urge the first ends 22,24 toward the anchor post 26 and a second spring 48 that also connects to the first brake shoe 12 with the second brake shoe 14 to urge the second ends 28,30 toward the adjuster strut mechanism 32. A typical actuator mechanism 54, of a type disclosed in U.S. Pat. No. 6,234,281, is located adjacent the anchor post 26, coupled to and actuable by a park brake actuation cable 56 in the vehicle. Thus, the springs are attached to the first and second webs for urging those webs toward the anchor 26, actuator assembly 54 and adjuster mechanism 32. Adjuster 32 is not simply a rigid coupling, which may experience periodic brake wear adjustment, it also supplies a brake force limiting feature.

Figure 2:
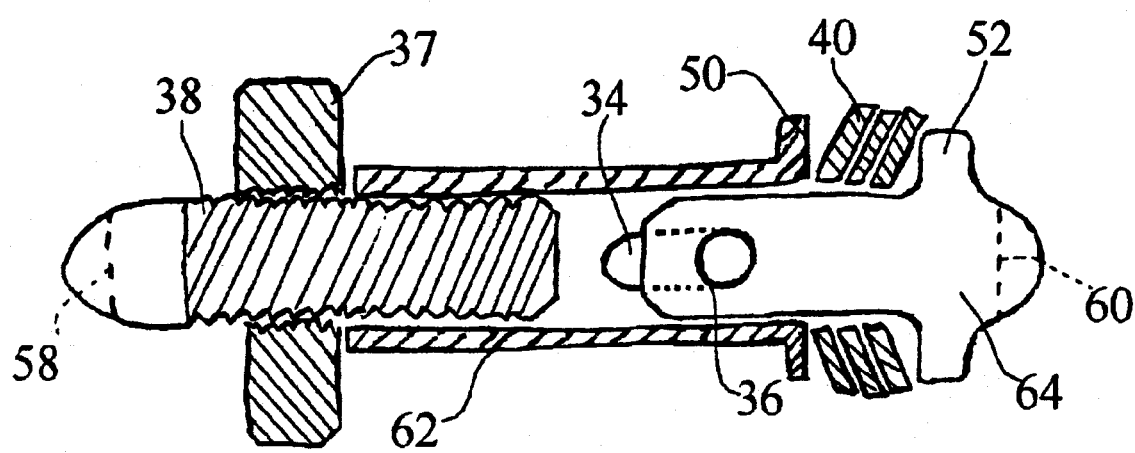
FIG. 2 is a side view, partially in cross-section, of the brake adjuster portion of FIG. 1.

Comparing FIGS. 1 and 2, the braking force limiting brake adjuster comprises a variable length elongated assembly having opposite ends notched as at 58 and 60 to engage ends 30 and 28 of webs 14 and 12 respectively. There is a threaded star wheel or adjuster nut 37 interengaged with a threaded adjuster screw or shaft 38 which may be relatively rotated to vary the separation between the assembly opposite ends to effect periodic running clearance adjustments. The engagement between the notch 58 and web 14 prevents the screw 38 from rotating with the nut 37 during adjustment. A sleeve 62 receives in one end a limited portion of the adjuster screw, the portion being determined by the relative position of the adjustment nut 37. A plunger 64 has a limited portion thereof received in the sleeve 62 other end. A transverse pin 36 fixed to one of the sleeve 62 and equalizing plunger 64 may experience limited axial travel in an elongated slot 34 in the other. As illustrated, the pin 36 is fixed to the plunger and the slot 34 is provided in a sidewall portion of the sleeve 62. The transverse pin is fixed to the plunger and passes through the elongated slot for limiting plunger travel within the sleeve. There is a flange 52 on the plunger 64 intermediate the ends thereof, and a similar flange on the sleeve 50. A load limiting compression spring 40 is captive between the sleeve flange 50 and plunger flange 52 creating a normally extended spring biased telescopic coupling between the notched ends 58 and 60. In FIG. 2, the plunger 64, sleeve 50, conical washers 40 and adjustment nut 37 and screw 38 are all generally coaxial. The compression spring may be one or more spring washers such as a wave washer or Belleville washer, or a leaf spring or other resilient arrangement may be employed. The spring 40 is shown as a plurality of aligned domed or conical washers, but other arrangements providing a resilient compressibility may be employed. The term Adomed@ is used in a generic sense to describe conical, spherical, or other shapes deformed from a planar configuration. The limited portion of the plunger, which is received in the sleeve, is determined by the separation between the flanges 50 and 52, which separation is controlled by the degree of compression of the spring 40. This spring bias coupling between the adjuster assembly ends normally urges the ends away from one another, but will yield upon a braking force attaining a predetermined maximum to compress reducing the separation between the brake shoe opposite ends and minimizing further increase in braking force.

Figure 3:
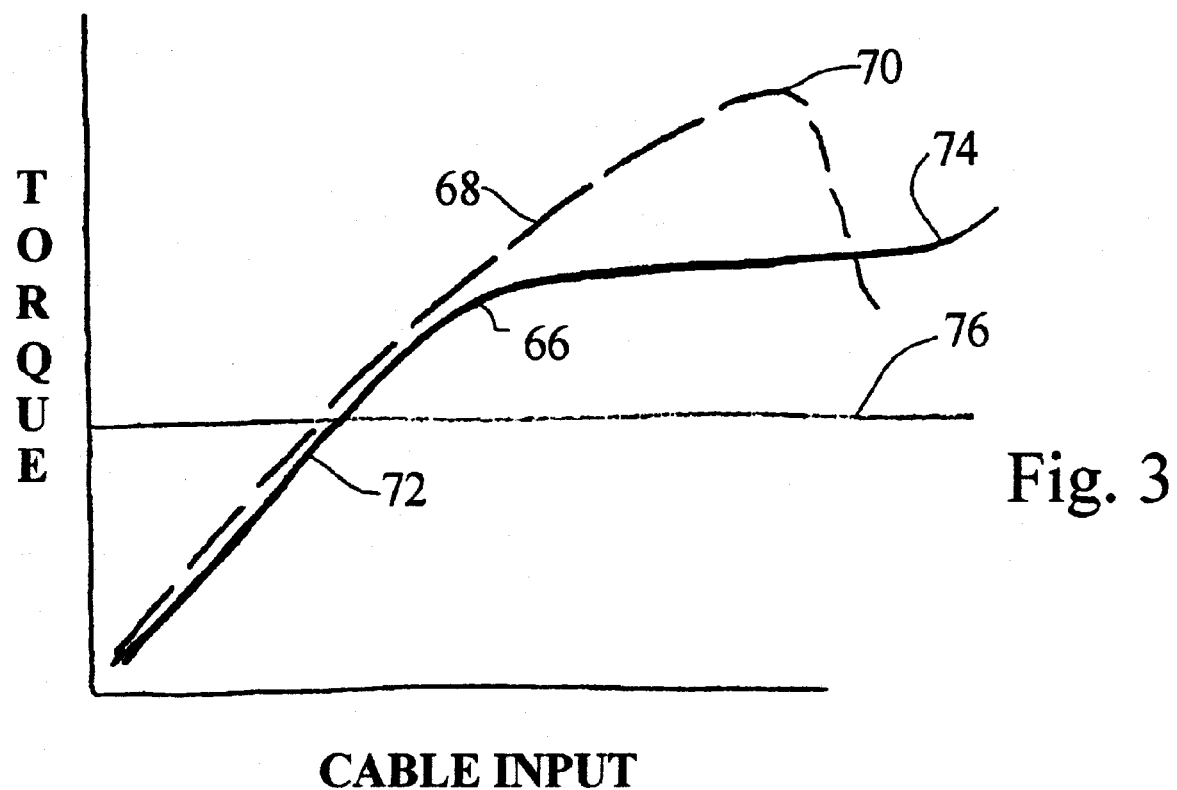
FIG. 3 is a graph comparing brake response to input both with and without the present invention.

FIG. 3, shows the relationship between the demanded braking force as determined by input as abscissa, and the resulting braking force illustrated by braking torque output as ordinate. The term "braking force" as used herein means the force measured in pounds or Newtons, for example, with which the braking surfaces are urged into contact with one another. "Torque" is the static resistance to turning up to the point where a wheel breaks free and thereafter is a dynamic resistance to rotation of the wheel. Torque is related to force by the coefficients of friction and other parameters of the system and might be measured in foot-pounds or joules. The braking force and cable input force are linearly related by the mechanical coupling parameters until reaching the knee region 66. In FIG. 3, the dotted curve 68 illustrates the behavior of prior art brakes. The relationship is nearly linear until, at maximum torque 70, catastrophic failure results in the output torque falling off. The solid line curve 72 shows brake behavior with the present invention. At a point well beyond the required hill holding torque shown by horizontal line 76, spring 40 begins to compress creating a knee 66 in the response curve. Further increase in cable pull demanding a torque increase results in a small, but positive increase in output torque. Finally, when the spring 40 is completely compressed at 74, torque output increase resumes with approximately the same slope as the brake experienced without the present invention.

Figure 4A:
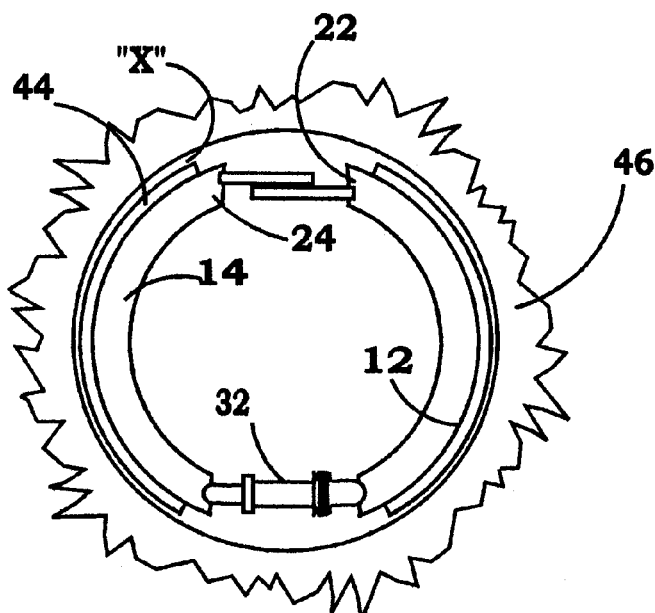
FIGS. 4a–4c are simplified illustrations of a brake drum, shoes, actuator and adjuster sequentially illustrating operation of the present invention.
Figure 4B:
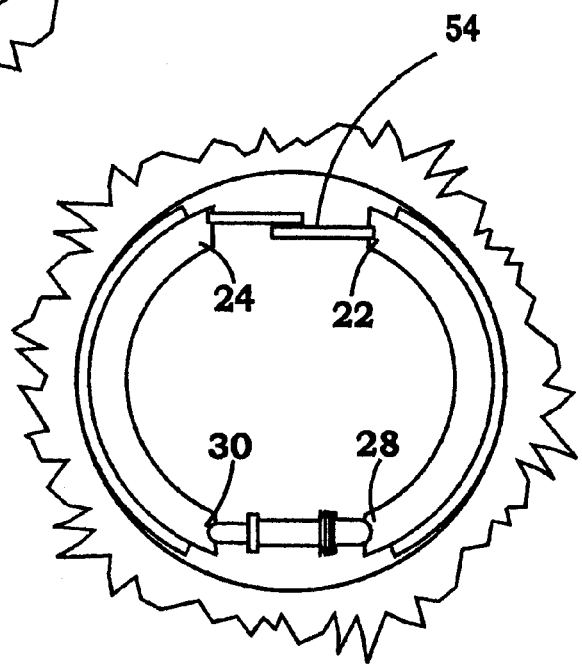
Figure 4C:
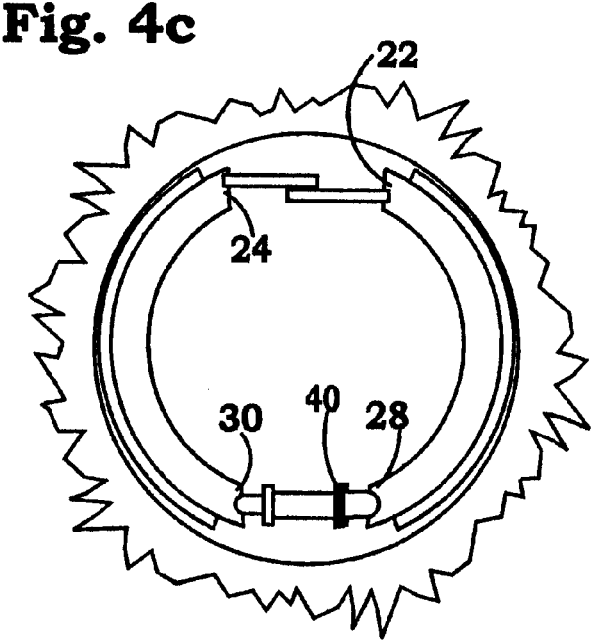

In FIG. 4, the brake drum 46, brake shoes 12 and 14, actuator 54 and adjuster 40 are illustrated in simplified form while the bias springs and other structures of FIG. 1 have been omitted for clarity. In FIG. 4a, the auxiliary brake in shown in the released position with a generally uniform running clearance "X" between the shoes and drum. Application of the auxiliary brake is achieved by pulling the cable 56 to spread the actuator 54 portions and move the upper ends 22 and 24 of brake shoes 12 and 14 away from one another and into firm engagement with the drum 46, compare FIGS. 4a and 4b. If the braking force approaches a dangerous limit, the spring 40 compresses, reducing the spacing between brake shoe ends 28 and 30 thereby relieving the excessive braking force as shown in FIG. 4c. Of course, the spring 40 compresses only to the extent necessary to relieve the excess force and continues to apply adequate braking force as illustrated in FIG. 3 by the section of the curve beyond the knee 66. The system does not trip, rather the transition from FIGS. 4b to 4c is gradual along the curve between the knee regions 66 and 74 of FIG. 3.

We claim:

1. In a drum-in-hat park brake assembly for a vehicle having a first brake shoe and a second brake shoe that are respectively retained on a backing plate that is secured to the vehicle, said first brake shoe having a first web with a first engagement end and a second engagement end, said second brake shoe having a second web with a first engagement end and a second engagement end, said first engagement end of each of said first and second webs being aligned with an actuator assembly while said second engagement end of each of said first and second webs is spaced apart by an adjuster mechanism, spring means attached to said first and second webs for urging said first and second webs toward an anchor, the actuator assembly and said adjuster mechanism, said adjuster mechanism including a yieldable member for reducing the space between the second engagement end of each of said first and second webs to limit the braking force to a predetermined maximum, said adjuster mechanism being characterized by a threaded inter-engaged adjuster screw and adjustment nut, a sleeve for receiving in a first end of a limited portion of said adjuster screw, said limited portion of said adjuster screw being determined by said adjustment nut, a plunger having a limited portion received in a second end of said sleeve, a first flange on said second end of said sleeve, a second flange on said plunger that is located intermediate of first and second ends thereof and a yieldable member comprising a load limiting compression spring captive between said sleeve flange and said plunger flange, said limited portion of the plunger being located in said sleeve and acting to define a separation between said sleeve and plunger flanges with said separation being controlled by the degree of compression of the compression spring.

2. The drum-in-hat park brake assembly of claim 1, wherein the compression spring comprises a plurality of aligned domed washers.

3. The drum-in-hat park brake assembly of claim 1, wherein said yieldable member compression spring comprises a plurality of aligned Belleville washers.

4. An auxiliary brake assembly for a wheeled vehicle, comprising:

a first braking surface fixed to a stationary portion of the vehicle defined by a pair of brake shoes disposed radially inwardly of a drum;

a second braking surface fixed to a rotatable member of the vehicle that is coupled to and rotates with a vehicle wheel defined by a drum inner surface of a drum-in hat brake rotor;

an operator actuable brake actuating assembly for selectively forcing the first and second brake surfaces together to retard the rotation of the vehicle wheel, said actuating assembly including a cable controlled actuator for varying a spacing between respective brake shoe first ends;

a brake force limiting mechanism operative upon the brake actuating force reaching a predetermined level to limit any further increase in brake actuating force comprising a first and second braking surface running clearance adjustment mechanism, said brake force limiting mechanism including a braking surface running clearance adjustment mechanism for adjusting the spacing between respective brake shoe second ends, adjustment mechanism comprises a variable length elongated assembly having opposite ends thereof engaging respective brake shoe second ends, a threaded portion for effecting periodic running clearance adjustments, and a normally extended spring biased telescopic portion compressible along an axis upon braking force exceeding a prescribed value to reduce the separation between the brake shoe second ends and thereby limit further increase in brake actuating force, said cable controlled actuator increasing braking force by increasing the spacing between respective brake shoe first ends and the brake force limiting mechanism functions to limit further increase an in brake actuating force by effecting a compensating decrease of the spacing between the respective brake shoe second ends.

5. A braking force limiting brake adjuster for a wheeled vehicle auxiliary brake assembly comprising a variable length elongated assembly having opposite ends thereof engaging one end of each of two brake shoes, a threaded portion for varying the separation between the assembly opposite ends to effect periodic running clearance adjustments, and a spring bias coupling between the assembly ends normally for urging the ends away from one another and yieldable upon a braking force attaining a predetermined maximum to define a compress force that reduces the separation between the ends and thereby minimizes any further increase in braking force, said adjuster being characterized by a threaded inter-engaged adjuster screw and adjustment nut, a sleeve for receiving in one end a limited portion of the adjuster screw the length of the limited portion of the adjuster screw being determined by the adjustment nut, a plunger having a limited portion thereof received in the sleeve other end, a first flange on the sleeve other end, a second flange on the plunger intermediate the ends thereof, said spring bias coupling being defined by a load limiting compression spring captive between the sleeve flange and plunger flange, the length of the limited portion of the plunger that is received in the sleeve being determined by the separation between the flanges, which separation is controlled by the degree of compression of the spring to control said further increase in braking force.

6. The braking force limiting brake adjuster of claim 5, wherein said spring bias coupling comprises a normally extended spring biased telescopic portion that is compressible along an axis upon a braking force exceeding a prescribed value to reduce the separation between the brake shoe opposite ends and thereby minimize a further increase in braking force.

7. The braking force limiting brake adjuster of claim 6, further comprising a plurality of aligned domed washers for providing the spring bias.

8. The braking force limiting brake adjuster of claim 5, further comprising an elongated slot in a sidewall portion of the sleeve and a transverse pin fixed to the plunger and passing through the elongated slot for limiting plunger travel within the sleeve.

* * * * *